United States Patent [19]

Sendelweck

[11] Patent Number: 4,603,362
[45] Date of Patent: Jul. 29, 1986

[54] GUIDING AND REGISTERING DIFFERENT THICKNESS DISKETTES IN A DISK DRIVE

[75] Inventor: Michael L. Sendelweck, Lafayette, Colo.

[73] Assignee: International Business Machines Corporation, Armonk, N.Y.

[21] Appl. No.: 564,879

[22] Filed: Dec. 23, 1983

[51] Int. Cl.$^4$ .............................................. G11B 5/012
[52] U.S. Cl. ......................................... 360/97; 360/99; 360/86
[58] Field of Search ..................... 360/97, 98, 99, 94, 360/88, 86, 81, 71, 2, 104, 109; 235/449, 450, 475, 483, 484; 271/248, 274, 250

[56] References Cited

U.S. PATENT DOCUMENTS

| | | | |
|---|---|---|---|
| 3,770,908 | 11/1973 | Craggs | 179/100.2 |
| 3,845,502 | 10/1974 | Paus | 360/86 |
| 4,040,106 | 8/1977 | Medley | 360/99 |
| 4,139,876 | 8/1977 | Owens | 360/97 |
| 4,259,699 | 3/1981 | Yoshida | 360/2 X |
| 4,301,486 | 6/1979 | Brown et al. | 360/133 |

*Primary Examiner*—John H. Wolff
*Assistant Examiner*—Andrew L. Sniezek
*Attorney, Agent, or Firm*—H. L. Knearl; C. M. Wright

[57] ABSTRACT

Loading mechanism for a disk drive is designed to load and to center any one of several disk cartridges having various thicknesses so that the disk within the cartridge is registered in a predetermined plane of rotation. A pair of guide rails, upper and lower, is mounted at each side of the insertion path for the cartridge. The upper and lower rails are movable relative to each other and relative to the frame of the disk drive. This allows the rails to separate to receive individual diskette cartridges having different thicknesses. After a cartridge is inserted, the loading mechanism will move the cartridge to a reference position where the disk within the cartridge is in the plane of rotaiton. The separation of the guide rails controls the reference position to which the cartridge is moved.

11 Claims, 13 Drawing Figures

FIG. 1

FIG. 2A
BOTTOM VIEW

FIG. 2B
TOP VIEW

GUIDING AND REGISTERING DIFFERENT THICKNESS DISKETTES IN A DISK DRIVE

FIELD OF THE INVENTION

This invention relates to floppy disk drives and more particularly to loading and registering diskette cartridges of different sizes in the same floppy disk drive.

BACKGROUND OF THE INVENTION

It is desirable to provide a hard diskette cartridge to protect a floppy disk contained within the diskette cartridge. A hard cartridge not only provides greater physical protection for the disk but also causes less drag on the floppy disk when the disk is being rotated.

It is also desirable that a diskette drive designed for a hard cartridge be able to use a soft cartridge as well. The users of hard cartridge diskette drives can then continue to use their present supply of soft diskette cartridges. However, a hard cartridge is much thicker than the conventional soft envelope cartridge. The problem then becomes how to load diskette cartridges of different sizes in a floppy disk drive and how to position them to the spindle that rotates the floppy disk. In other words, both cartridges must be loaded so that the floppy disk is in the same plane of rotation of the spindle.

U.S. Pat. Nos. 3,770,908 and 3,845,502 are examples of floppy disk drives with cartridge carriers that move a cartridge into the spindle plane of rotation after the cartridge is inserted in the drive. However, all cartridges have the same thickness. Therefore, the carriers do not have to bring cartridges of different thicknesses to a position where the flexible disk in each cartridge is in the same predetermined plane of rotation.

SUMMARY OF THE INVENTION

In accordance with this invention, the above problem has been solved by detecting the thickness of a cartridge as it is inserted into a drive and using that detected thickness to move the cartridge to the desired plane of rotation for the flexible disk within the cartridge. This is accomplished by guide rails at the sides of the insertion path for the cartridge in the disk drive. The guide rails are split into top and bottom portions both of which are movable along the axis of rotation of the disk in the disk drive. The top and bottom portions of the guide rails effectively form a guiding channel for the cartridge that floats relative to the plane of rotation for the disk. In addition, the top portion is movable relative to the bottom portion so that the width of the guiding channel can vary to accommodate cartridges having different thicknesses. The width of the guiding channel controls the final reference position for the guide rails. In the reference position, the channel and thus the cartridge will be centered about the plane of rotation of the disk in the cartridge.

BRIEF DESCRIPTION OF THE DRAWING

The invention is described in detail below with reference to drawing, illustrating specific embodiments of the invention, in which.

DETAILED DESCRIPTION

To load a cartridge, the loading frame 10 (FIG. 1) is opened by rotating door 12 in the direction indicated by arrow 14. As door 12 opens, its top translates in the direction indicated by arrow 16. Frame 10 is attached to door 12 at hinge 15 and pivots about flexible hinge 17. As frame 10 swings up, it carries with it collet 18, pressure pad 20, pressure probe 22 and guide rail springs 24.

Figure 1:
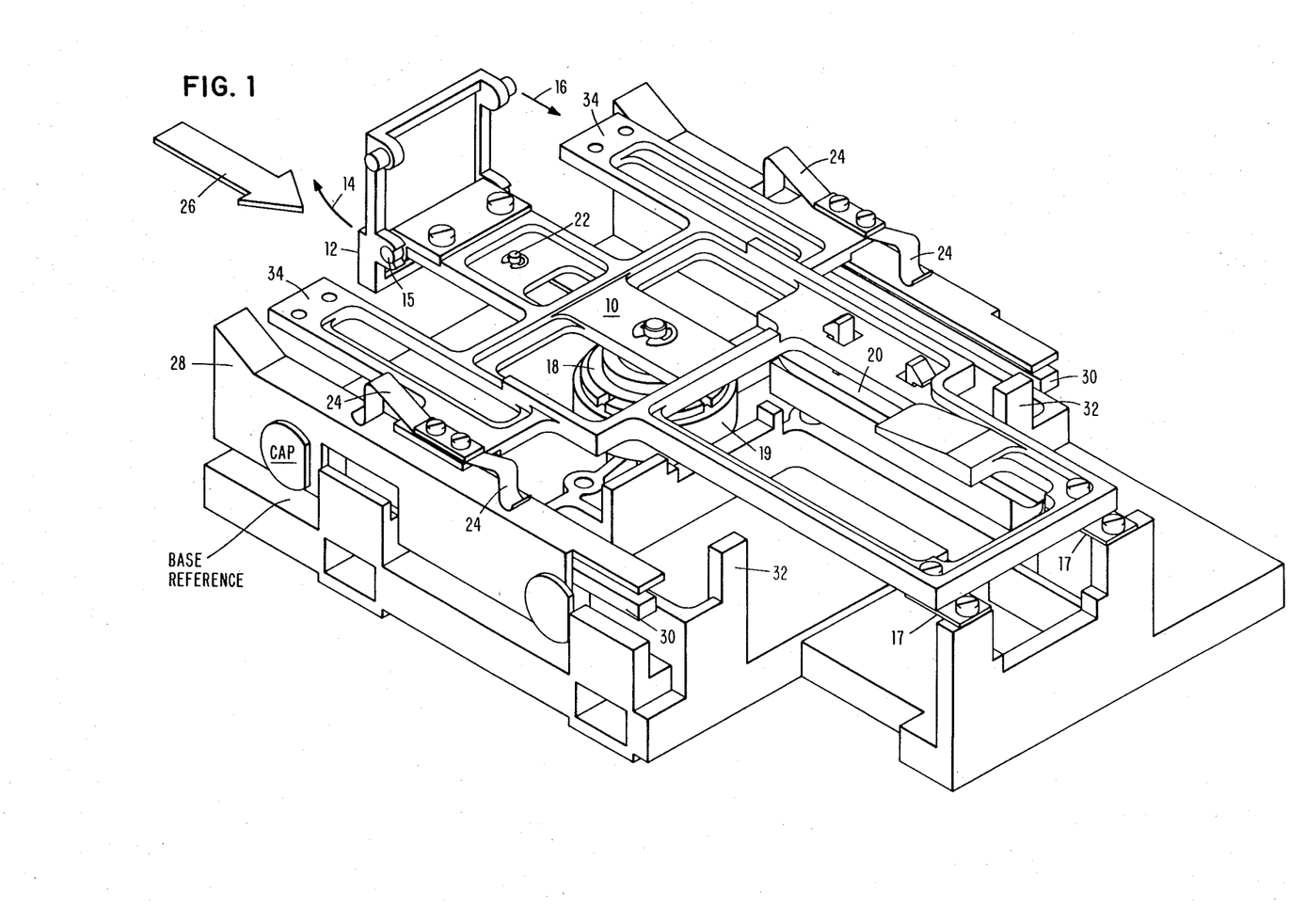
FIG. 1 is an overview of the load/unload mechanism in the floppy disk drive viewed from above and behind the drive.

A diskette cartridge is inserted in the direction shown by large arrow 26. The diskette slides into the drive between upper side rail 28 and lower side rail 30 which guide and support the cartridge. There is a pair of upper and lower guiding rails on each side of the drive. The diskette cartridge slides into the drive until the cartridge strikes reference stops 32.

There are spring fingers (not shown) which are attached at the front extensions 34 of frame 10. These spring fingers urge a partially inserted diskette against stops 32 as the frame 10 is lowered after the insertion of a diskette cartridge.

Figure 2A:
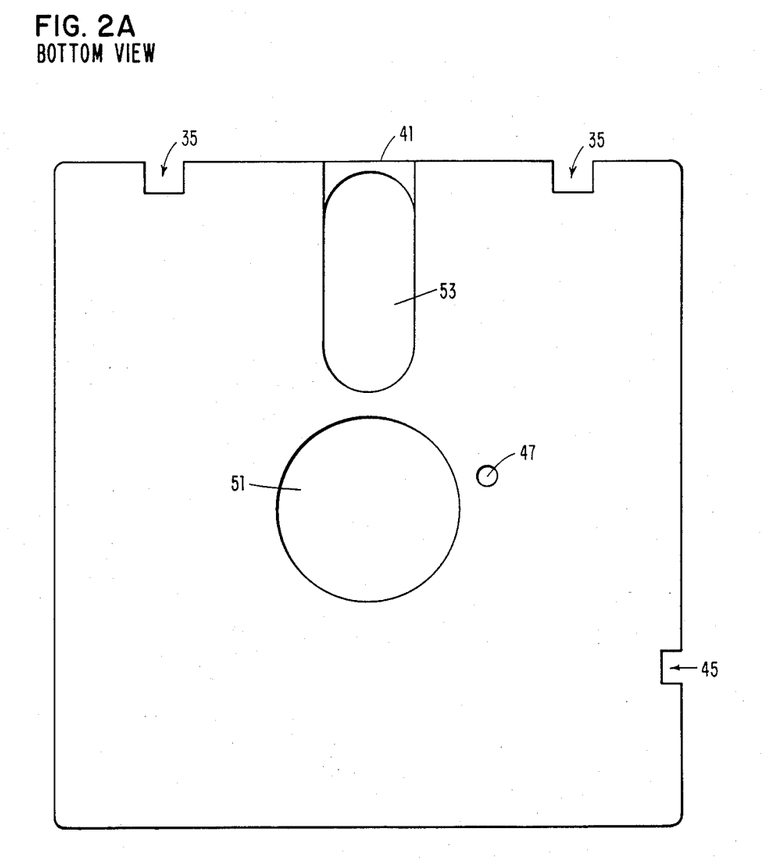
FIG. 2A is a bottom view of a hard diskette cartridge except that the floppy disk within the cartridge is missing.

In FIG. 2A, the hard diskette cartridge contains notches 35 that mate with reference stops 32 in FIG. 1. A soft diskette is shorter in length and does not have notches. When the hard and soft diskette cartridges engage stops 32 in FIG. 1, the cartridge is substantially centered relative to the axis of rotation of spindle 19.

Figure 2B:
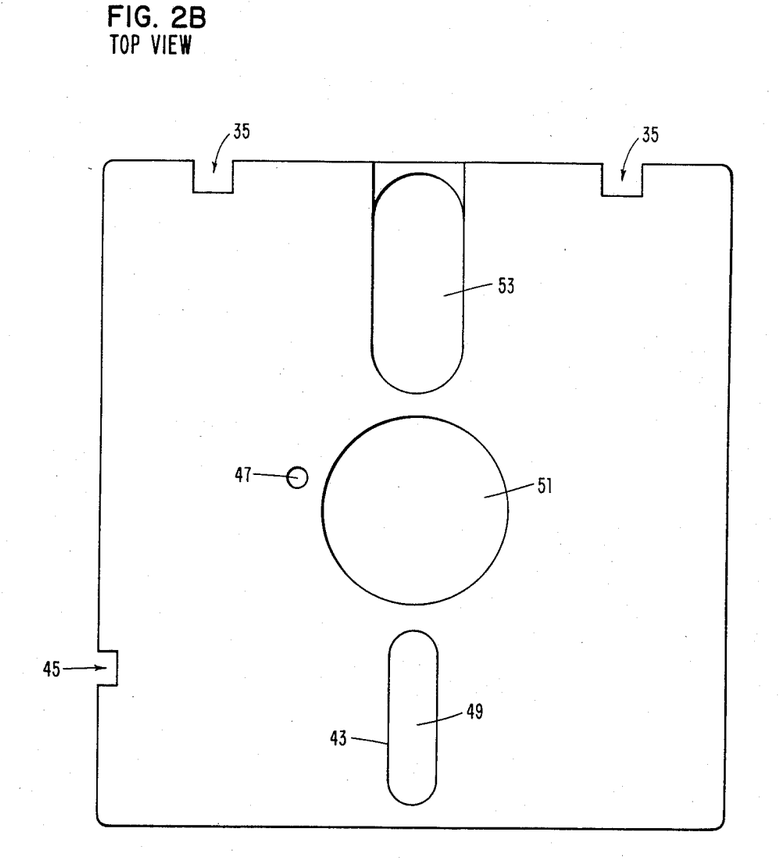
FIG. 2B is a top view of the diskette cartridge of FIG. 2A.

In FIGS. 2A and 2B, opening 51 in the hard diskette cartridge is for the collet and spindle which grip the floppy disk and rotate it during read/write operations. Opening 53 is for the read/write head. Cleaning pad 49 is a part of the diskette cartridge. Pad 49 is loosely mounted in the cartridge and is captured by opening 43 in the top wall of the cartridge. Notch 45 is the write protect notch. Finally, hole 47 is the opening through which the index hole in the floppy disk is sensed.

In FIG. 2B, access opening 53 in the top half of the cartridge is open at the front edge of the cartridge. Also in FIG. 2A, end 41, that closes the front edge of opening 53 in the bottom half of the cartridge, is recessed. This allows the hard cartridge to enter and exit the drive without striking the upper or lower recording heads (not shown). Thus, the hard diskette cartridge may be inserted without striking anything in the drive until it reaches stops 32 (FIG. 1).

Figure 3A:
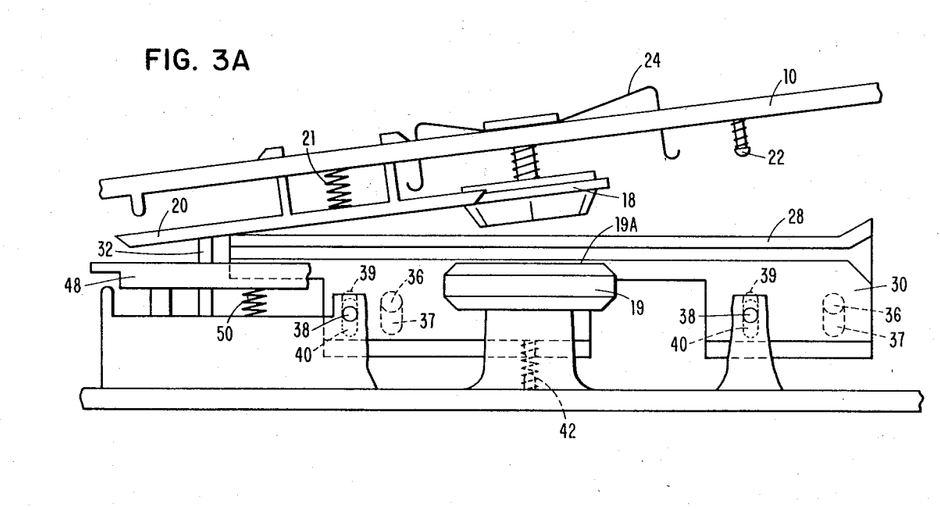
FIGS. 3A-3C are cutaway side views showing the loading of a soft diskette cartridge.
Figure 3B:
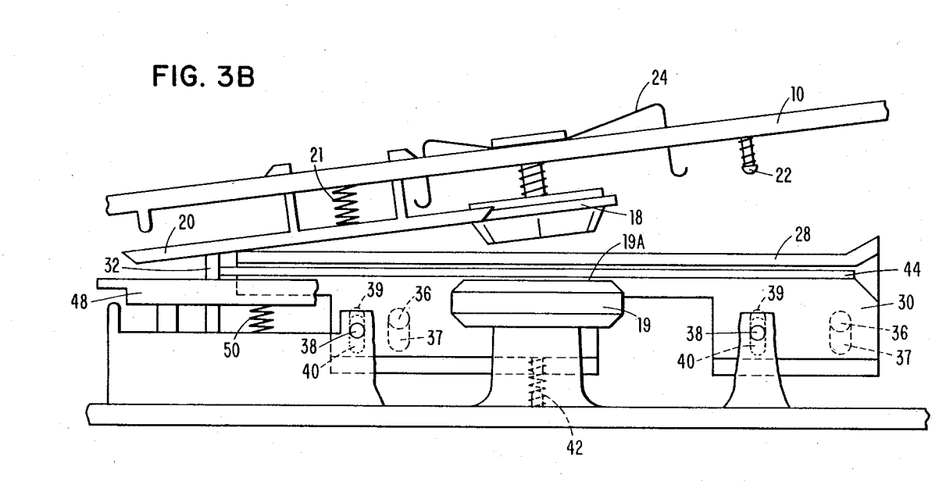
Figure 3C:
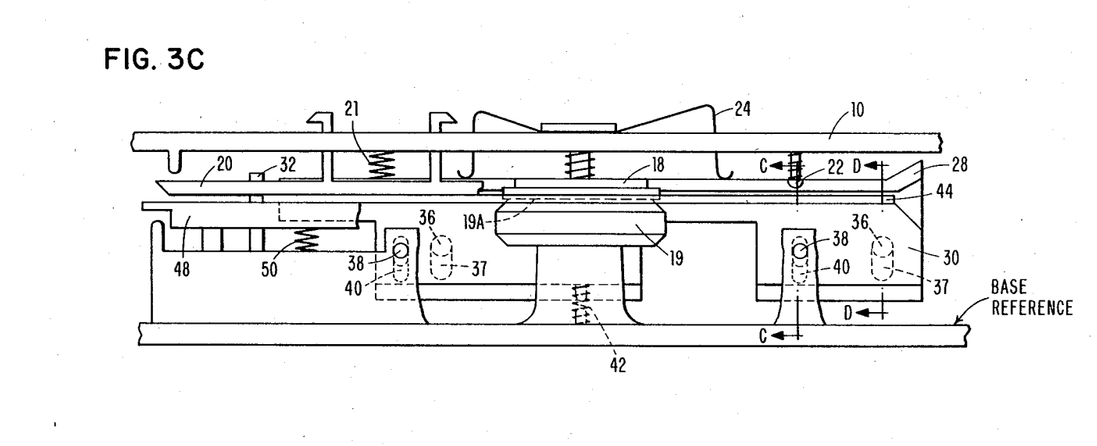

In FIGS. 3A to 3C, the loading sequence for a soft diskette cartridge is shown. In each of the FIGS. 3A-3C, most of the frame is cut away and the upper side rail 28 and lower side rail 30 on the far side wall are shown. Accordingly, the drive spindle 19, with which the collet 18 mates to clamp the floppy disk, is visible. The top surface 19A of the drive spindle 19 is the critical reference plane of rotation to which the floppy disk in the diskette cartridge must be registered.

The upper side rail 28 is slideably mounted relative to the lower side rail 30. Lower side rail 30 contains pins 36 which protrude into slots 37 in upper side rail 28. The separation distance between upper and lower side rails 28 and 30 is controlled by the top of slots 37 engaging the top of pins 36. This separation distance is slightly greater than the thickness of a soft diskette cartridge.

Pins 38 are fixed in the frame of the disk drive and extend through slot 39 (dashed line) in lower side rail 30 and slots 40 (dotted line) in upper side rail 28.

When loading frame 10 is in the open or unload position as in FIG. 3A, spring 42 pushes the lower side rail 30 up until the bottom of its slot 39 engages the bottom of reference pin 38. This positions the lower side rail 30 slightly above the spindle 19 and recording head (not shown). Therefore, when the diskette is inserted (FIG. 3B), it goes in smoothly without striking anything in the drive until it reaches stops 32 (FIG. 1).

After the diskette 44 is inserted, the loading frame 10 is lowered to a closed or load position (FIG. 3C). As frame 10 comes down, springs 24 push the upper side rail 28 down. Since slot 37 in the upper side rail is already resting on the top of pins 36 in the lower side rail, the lower side rail is also pushed down. Accordingly as frame 10 comes down, both the lower side rail 30 and the upper side rail 28 move down until slots 40 in the upper side rail are stopped by the top of reference pins 38. Accordingly, the reference position for positioning the floppy disk in the soft diskette cartridge in the plane of rotation of the top surface 19A of spindle 19 is defined by the top of slots 40 bottoming on pins 38.

As the side rails are pushed down to the reference position by the lowering of frame 10, collet 18 centers and clamps the floppy disk against spindle surface 19A. Also, pressure pad 20, biased by spring 21, presses against the top surface of the soft diskette while pressure pad 48 is spring-biased by spring 50 to press against the bottom of the soft diskette. The diskette itself contains the wiping material which cleans the surface of the floppy disk as it rotates. Pressure probe 22, used to operate cleaning pad 49 (FIG. 2B) in the hard cartridge, does not extend far enough down to press on the soft cartridge when the soft cartridge is loaded.

Figure 4A:
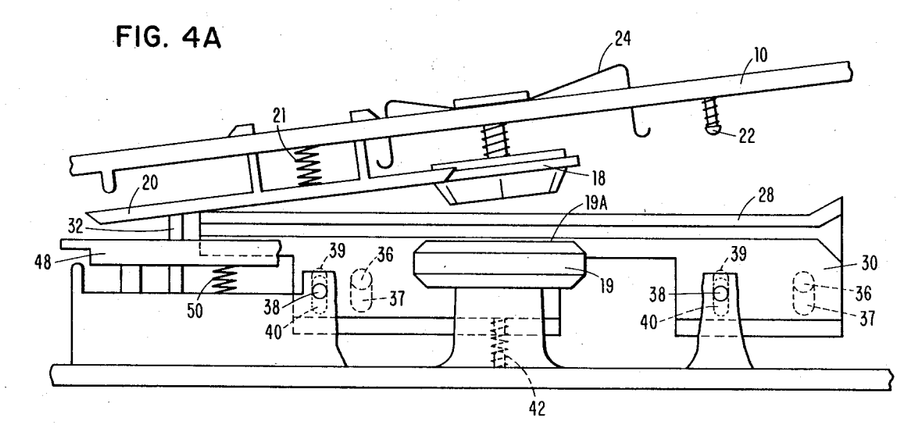
FIGS. 4A-4C are cutaway side views showing the loading of a thick, hard diskette cartridge.
Figure 4B:
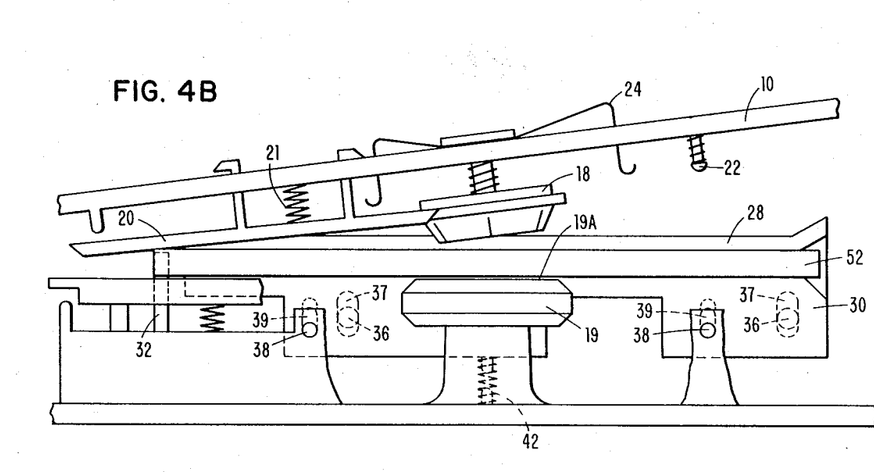
Figure 4C:
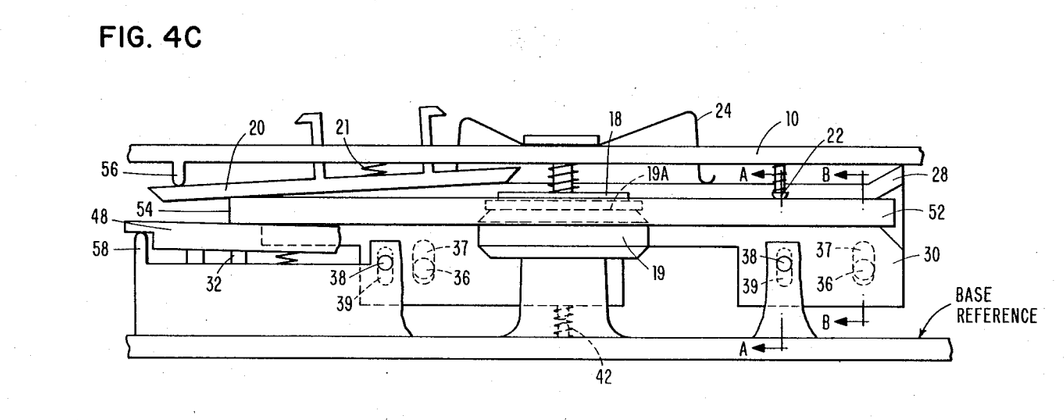
Figure 5A:
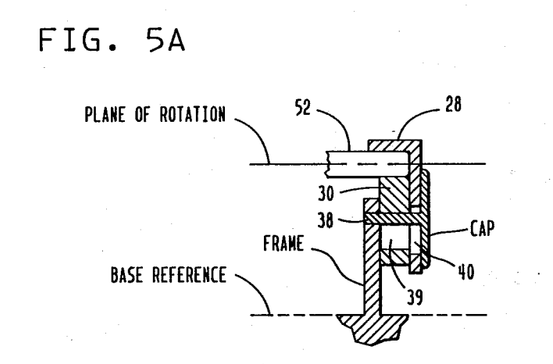
FIG. 5A is a cross sectional view taken along line A—A of FIG. 4c.
Figure 5B:
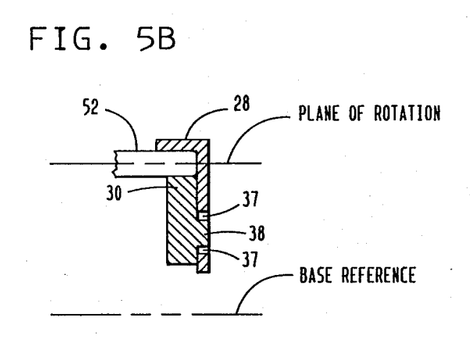
FIG. 5B is a cross sectional view taken along line B—B in FIG. 4c.
Figure 5C:
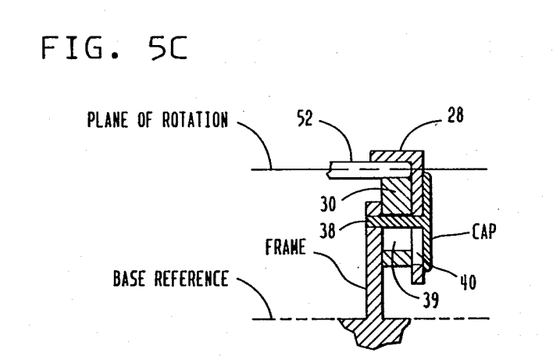
FIG. 5c is a cross sectional view taken along line C—C of FIG. 3c.
Figure 5D:
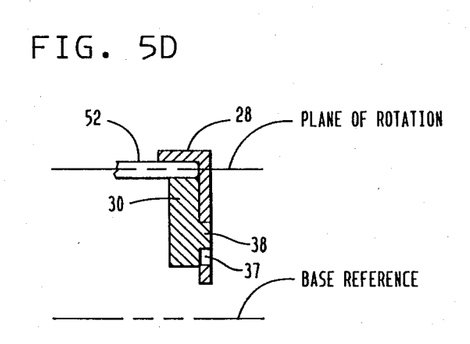
FIG. 5D is a cross sectional view taken along line D—D of FIG. 3c.

In FIGS. 4A–4C, the sequence of operations for loading a hard cartridge in the disk drive is shown. In FIG. 4A, loading frame 10 lifts collet 18 and springs 24 away from spindle 19 and upper guide rails 28. Of course, the position of the elements in FIG. 4A is identical to the elements in FIG. 3A.

In FIG. 4B, the hard cartridge which is more than twice as thick as the soft cartridge, has been inserted into the disk drive. The cartridge is registered in the direction of the insertion path by striking stops 32. The cartridge is registered laterally by the side rails. The vertical registration is accomplished also by the side rails as now described.

The bottom side rail 30 in FIG. 4B is positioned by spring 42 so that the bottom of each slot 39 is held against each pin 38. This holds the lower side rail 30 above the level of the spindle 19 and thus above the plane of rotation.

After the hard cartridge is inserted, the separation between the upper side rail 28 and the lower side rail 30 is defined by the thickness of the hard cartridge 52. With the hard cartridge 52 in the disk drive, slot 37 in the upper rail 28 is not limited in downward motion by pins 36 molded into the lower side rail 30. Instead, the downward motion is limited by slots 39 striking the top of pins 38 as shown in FIG. 4C.

In FIG. 4C, the loading frame 10 is lowered into the load position. As frame 10 comes down, springs 24 push against the top side rail 28, which in turn pushes cartridge 52 down, which in turn pushes bottom side rail 30 down. This downward motion stops when the top of slots 39 in the lower side rail strikes the top of pins 38. Accordingly, the vertical referencing position of the hard diskette is defined by the top of slot 39 in lower side rail 28 contacting pins 38. In this position, the top surface 19A of spindle 19 and therefore the plane of rotation of the floppy disk is vertically centered within diskette cartridge 52 as shown in FIG. 4C.

When loading frame 10 is down, collet 18 clamps the floppy disk (not shown) to the top surface 19A of spindle 19. At the same time, pressure pin 22 which pushes against the cleaning pad 49 (FIG. 2B) in the hard cartridge is in an operative position.

The soft cartridge pressure pads 20 and 48 could cause the floppy disk to bind somewhat within the hard cartridge if they were allowed to operate. Therefore, when the frame 10 is in the lowered position, pressure pad 20 is pivoted away from the surface of the cartridge by lever action between the edge 54 of the hard cartridge and pin 56 on loading frame 10. Similarly, pressure pad 48 is pivoted away from the hard cartridge 52 by the lever action between edge 54 of the cartridge and pin 58 on the drive frame. Thus pressure pads 20 and 48 are not operative when the hard cartridge is inserted into the diskette drive.

While I have illustrated and described the preferred embodiment of my invention, it is understood that I do not limit myself to the precise constructions herein disclosed and the right is reserved to all changes and modifications coming within the scope of the invention as defined in the appended claims.

What is claimed is:

1. In a disk drive for reading or writing information on disks in disk cartridges of different thicknesses, said drive having means for rotating the disk within a disk cartridge in a predetermined plane of rotation, improved apparatus for loading and registering an inserted one of said disk cartridges in the drive, said improvement comprising:

lower guide means for supporting and guiding a disk cartridge as it is inserted into the drive;

upper guide means movably connected with said lower guide means for adjusting to the thickness of said inserted cartridge; and means responsive to the thickness of said inserted cartridge for moving said lower and upper guide means to positions in which an inserted cartridge is registered with its disk in the predetermined plane of rotation regardless of the thickness of said inserted cartridge.

2. The apparatus of claim 1 further comprising:

means for slideably mounting said upper guide means to said lower guide means whereby said upper guide means is pushed away from said lower guide means when a thick cartridge is inserted so that said upper guide means is supported by said inserted cartridge; and means on said lower guide means for supporting said upper guide means when a thin cartridge is inserted in the drive.

3. The apparatus of claim 2 further comprising:

stop means for defining a reference position at a fixed position relative to the predetermined plane of rotation, said stop means engaging either said upper guide means or said lower guide means, depending on whether a thick or thin cartridge is inserted in the drive, and for preventing movement of said guide means and said inserted cartridge at the reference position.

4. The apparatus of claim 3 further comprising:

means in said upper guide means for engaging said stop means when a thin cartridge is inserted in the drive; and means in said lower guide means for engaging said stop means when a thick cartridge is inserted in the drive.

5. Apparatus for loading any one of a plurality of disk cartridges of at least two different thicknesses in a disk drive, said drive having means for rotating the disk about an axis of rotation and in a predetermined plane of rotation after a cartridge is loaded in the drive, said apparatus comprising:

reference stop means fixed at a position relative to the plane of rotation;

guide means for guiding a cartridge as the cartridge is inserted into the disk drive, said guide means comprising two portions, a top portion for guiding the top of the cartridge and a bottom portion for guiding the bottom of the cartridge, both portions moveable in a direction parallel to the axis of rotation so that said guide means move independently relative to the plane of rotation;

means disposed between the two portions for controlling the separation of said portions when a soft cartridge is inserted into the disk drive and for allowing separation of said portions by the cartridge when a hard cartridge is inserted into the disk drive; and means for biasing said guide means, after a cartridge is inserted, to a position where said guide means engages said reference stop means at a position along the axis of rotation dependent on the separation of the two guiding portions so that whichever thickness cartridge is inserted in the disk drive the disk within the cartridge is positioned in the plane of rotation.

6. The apparatus of claim 5 further comprising:

indexing means having a fixed position relative to the axis of rotation for engaging a cartridge when fully inserted so that the center of the diskette cartridge is substantially aligned with the axis of rotation.

7. The apparatus of claim 5 wherein said rotating means comprises lower driven spindle means having a top surface fixed relative to the reference stop for defining the plane of rotation and upper rotatable clamping means for clamping the disk to the top surface of the spindle means after the cartridge is inserted in the disk drive; and further comprising:

loading means having an unload position for lifting said biasing means away from said guide means and said clamping means away from said spindle means so that a cartridge can be inserted in or removed from the disk drive, said loading means having a load position for lowering said biasing means and said clamping means onto said guide means and said spindle means after the cartridge is inserted.

8. The apparatus of claim 7 and in addition:

second biasing means for biasing said guide means, when said loading means is in the unload position, to a position where the bottom guide portion is above the plane of rotation and the top guide portion is below said clamping means so that said cartridge may be inserted in or removed from the disk drive without striking said rotating means.

9. In a disk drive for reading and writing magnetic signals on a magnetic disk in a disk cartridge, apparatus for guiding and registering the cartridge in the drive so that the disk within the cartridge rotates about a predetermined axis of rotation in a predetermined plane of rotation, said apparatus comprising:

means for rotating the disk within the cartridge, said means having a rotary driven spindle means whose axis of rotation defines the predetermined axis of rotation and including collet means for centering the floppy disk on the spindle means and for clamping the disk to a top surface of said spindle means, said top surface defining the predetermined plane of rotation;

upper and lower guide rail means disposed at each side of the cartridge insertion path for guiding the cartridge into the disk drive, said upper guide rail means movable relative to its associated lower guide rail means so that a guiding channel for the cartridge formed by both rail means will accommodate cartridges of various thicknesses, each paired set of guide rail means movable relative to the predetermined plane of rotation; and loading means for moving both paired set of guide rail means to a position where the guiding channel and the cartridge inserted into the channel are centered about the predetermined plane of rotation so that the disk in the cartridge will rotate in the predetermined plane of rotation.

10. The apparatus of claim 9 wherein said loading means comprises:

reference stop means for each pair of guide rail means;

loading frame means for carrying said collet means away from or toward said spindle means so that the disk cartridge can be inserted between the collet means and the spindle means;

first spring means for each paired set of guide rail means for pushing each of said paired set against one side of said reference stop means to a position where the guiding channel is above the predetermined plane of rotation so that the cartridge insertion path is above the top surface of the spindle means; and second spring means for each paired set of guide rail means and mounted on said loading frame means for pushing each paired set against the other side of said reference stop means to the position where the disk in said cartridge is centered in the predetermined plane of rotation.

11. The apparatus of claim 10 wherein:

each paired set of guide rail means provides one of a plurality of surfaces to engage said other side of the reference stop means, the surface engaging said other side depending upon the width of the guiding channel.

* * * * *